United States Patent
Nguyen

(10) Patent No.: US 8,224,998 B2
(45) Date of Patent: Jul. 17, 2012

(54) MICRO-CLIENT FOR INTERNET APPLIANCES

(76) Inventor: Julien T Nguyen, Saratoga, CA (US)

(*) Notice: Subject to any disclaimer, the term of this patent is extended or adjusted under 35 U.S.C. 154(b) by 0 days.

(21) Appl. No.: 12/552,188

(22) Filed: Sep. 1, 2009

(65) Prior Publication Data

US 2009/0327522 A1    Dec. 31, 2009

Related U.S. Application Data

(63) Continuation of application No. 11/512,793, filed on Aug. 30, 2006, now Pat. No. 8,103,738, which is a continuation of application No. 10/418,951, filed on Apr. 18, 2003, now Pat. No. 7,325,077, which is a continuation of application No. 08/918,096, filed on Aug. 21, 1997, now Pat. No. 6,564,250.

(51) Int. Cl.
*G06F 15/16* (2006.01)

(52) U.S. Cl. ......... 709/246; 709/247; 725/131; 370/466

(58) Field of Classification Search .................. 709/246, 709/247; 725/131; 370/466
See application file for complete search history.

(56) References Cited

U.S. PATENT DOCUMENTS

| | | | |
|---|---|---|---|
| 5,204,947 A | 4/1993 | Bernstein et al. | |
| 5,377,354 A | 12/1994 | Scannell et al. | |
| 5,499,109 A | 3/1996 | Mathur et al. | |
| 5,508,817 A | 4/1996 | Kunigami | |
| 5,513,126 A | 4/1996 | Harkins et al. | |
| 5,548,745 A | 8/1996 | Egan et al. | |
| 5,548,789 A | 8/1996 | Nakanura | |
| 5,572,643 A | 11/1996 | Judson | |
| 5,572,648 A | 11/1996 | Bibayan | |
| 5,574,843 A | 11/1996 | Gerlach, Jr. | |
| 5,588,105 A | 12/1996 | Foster et al. | |
| 5,619,648 A | 4/1997 | Canale et al. | |
| 5,623,503 A | 4/1997 | Rutkowski | |
| 5,623,603 A | 4/1997 | Jiang et al. | |
| 5,627,764 A | 5/1997 | Schutzman et al. | |
| 5,630,060 A | 5/1997 | Tang et al. | |
| 5,652,749 A * | 7/1997 | Davenport et al. | ........... 370/466 |

(Continued)

FOREIGN PATENT DOCUMENTS

WO    WO-99050744    10/1999

OTHER PUBLICATIONS

"Non Final Office Action", U.S. Appl. No. 11/513,584, (Jun. 25, 2010), 24 pages.

(Continued)

*Primary Examiner* — Kyung H Shin

(57) ABSTRACT

A method and system are described for providing features for internet access at an internet appliance which go beyond the resource limitations of the internet appliance. Such features may be implemented on the server, and coupled to the internet appliance for display, responsive to the ability of the internet appliance to provide those features. (1) The internet appliance and the server adapt to communication link limitations by dynamically adjusting picture quality or size for graphics to be displayed. (2) The internet appliance and the server adapt to memory and processor limitations by dynamically running applets at the server and intercepting display functions of applets for display at the internet appliance. (3) The internet appliance and the server adapt to memory and processor limitations by dynamically running editing programs or web pages at the server and by dynamically adjusting picture quality or size for graphics to be displayed.

23 Claims, 1 Drawing Sheet

U.S. PATENT DOCUMENTS

| | | | |
|---|---|---|---|
| 5,666,542 A | 9/1997 | Katai et al. | |
| 5,673,316 A | 9/1997 | Auerbach et al. | |
| 5,675,507 A | 10/1997 | Bobo, II | |
| 5,680,619 A | 10/1997 | Gudmundson et al. | |
| 5,694,163 A | 12/1997 | Harrison | |
| 5,705,502 A | 1/1998 | Zimmermann | |
| 5,706,502 A | 1/1998 | Foley et al. | |
| 5,710,863 A | 1/1998 | Chen | |
| 5,710,883 A | 1/1998 | Hong et al. | |
| 5,724,574 A | 3/1998 | Stratigos et al. | |
| 5,727,159 A | 3/1998 | Kikinis | |
| 5,732,218 A | 3/1998 | Bland et al. | |
| 5,734,835 A | 3/1998 | Selker | |
| 5,737,519 A | 4/1998 | Abdelnour et al. | |
| 5,737,599 A | 4/1998 | Rowe et al. | |
| 5,737,619 A | 4/1998 | Judson | |
| 5,742,768 A | 4/1998 | Gennaro et al. | |
| 5,754,235 A | 5/1998 | Urano et al. | |
| 5,754,700 A | 5/1998 | Kuzma | |
| 5,754,765 A | 5/1998 | Danneels et al. | |
| 5,754,851 A | 5/1998 | Wissner | |
| 5,761,673 A | 6/1998 | Bookman et al. | |
| 5,764,235 A | 6/1998 | Hunt et al. | |
| 5,768,505 A | 6/1998 | Gilchrist et al. | |
| 5,781,741 A | 7/1998 | Imamura et al. | |
| 5,781,785 A | 7/1998 | Rowe et al. | |
| 5,784,058 A | 7/1998 | LaStrange et al. | |
| 5,784,553 A | 7/1998 | Kolawa et al. | |
| 5,787,175 A | 7/1998 | Carter | |
| 5,787,470 A | 7/1998 | DeSimone et al. | |
| 5,794,039 A | 8/1998 | Guck | |
| 5,794,259 A | 8/1998 | Kikinis | |
| 5,802,530 A | 9/1998 | Van Hoff | |
| 5,805,829 A | 9/1998 | Cohen et al. | |
| 5,809,512 A | 9/1998 | Kato | |
| 5,818,435 A | 10/1998 | Kozuka et al. | |
| 5,818,447 A | 10/1998 | Wolf et al. | |
| 5,821,926 A | 10/1998 | Arita | |
| 5,826,102 A | 10/1998 | Escobar et al. | |
| 5,828,839 A | 10/1998 | Moncreiff | |
| 5,835,683 A | 11/1998 | Corella et al. | |
| 5,842,020 A | 11/1998 | Faustini | |
| 5,845,299 A | 12/1998 | Arora et al. | |
| 5,848,415 A | 12/1998 | Guck | |
| 5,850,446 A | 12/1998 | Berger et al. | |
| 5,854,299 A | 12/1998 | Muhlebach et al. | |
| 5,854,893 A | 12/1998 | Ludwig et al. | |
| 5,859,967 A | 1/1999 | Kaufeld et al. | |
| 5,862,260 A | 1/1999 | Rhoads | |
| 5,870,544 A | 2/1999 | Curtis | |
| 5,872,915 A | 2/1999 | Dykes et al. | |
| 5,875,322 A | 2/1999 | House et al. | |
| 5,878,223 A | 3/1999 | Becker et al. | |
| 5,889,942 A | 3/1999 | Orenshteyn | |
| 5,890,129 A | 3/1999 | Spurgeon | |
| 5,898,836 A | 4/1999 | Freivald et al. | |
| 5,909,545 A | 6/1999 | Frese et al. | |
| 5,911,776 A | 6/1999 | Guck | |
| 5,918,012 A | 6/1999 | Astiz et al. | |
| 5,918,013 A | 6/1999 | Mighdoll et al. | |
| 5,923,885 A | 7/1999 | Johnson et al. | |
| 5,937,160 A | 8/1999 | Davis et al. | |
| 5,940,834 A | 8/1999 | Pinard et al. | |
| 5,956,491 A | 9/1999 | Marks | |
| 5,956,701 A | 9/1999 | Hamermehl | |
| 5,963,217 A | 10/1999 | Grayson et al. | |
| 5,995,093 A | 11/1999 | Lambourne et al. | |
| 6,008,836 A * | 12/1999 | Bruck et al. | 725/131 |
| 6,009,462 A | 12/1999 | Birrell et al. | |
| 6,014,688 A | 1/2000 | Venkatraman et al. | |
| 6,014,694 A * | 1/2000 | Aharoni et al. | 709/219 |
| 6,029,164 A | 2/2000 | Birrell et al. | |
| 6,032,150 A | 2/2000 | Nguyen | |
| 6,067,565 A | 5/2000 | Horvitz | |
| 6,067,579 A | 5/2000 | Hardman et al. | |
| 6,073,163 A | 6/2000 | Clark et al. | |
| 6,108,027 A * | 8/2000 | Andrews et al. | 348/14.14 |
| 6,131,116 A | 10/2000 | Riggins et al. | |
| 6,185,551 B1 | 2/2001 | Birrell et al. | |
| 6,185,625 B1 * | 2/2001 | Tso et al. | 709/247 |
| 6,212,535 B1 | 4/2001 | Weikart et al. | |
| 6,233,600 B1 | 5/2001 | Salas et al. | |
| 6,285,889 B1 | 9/2001 | Nykanen et al. | |
| 6,329,994 B1 | 12/2001 | Gever et al. | |
| 6,343,302 B1 | 1/2002 | Graham | |
| 6,377,978 B1 | 4/2002 | Nguyen | |
| 6,401,134 B1 | 6/2002 | Razavi et al. | |
| 6,542,923 B2 | 4/2003 | Nguyen | |
| 6,564,250 B1 | 5/2003 | Nguyen | |
| 6,584,498 B2 | 6/2003 | Nguyen | |
| 6,601,108 B1 | 7/2003 | Marmor | |
| 6,718,321 B2 | 4/2004 | Birrell et al. | |
| 6,779,178 B1 | 8/2004 | Lloyd et al. | |
| 7,647,550 B1 | 1/2010 | Nguyen | |
| 2002/0059447 A1 | 5/2002 | Nguyen | |
| 2002/0147788 A1 | 10/2002 | Nguyen | |
| 2010/0115388 A1 | 5/2010 | Nguyen | |

OTHER PUBLICATIONS

"Notice of Allowance/Base Issue Fee", U.S. Appl. No. 10/446,623, (Sep. 4, 2009), 7 pages.

"Non Final Office Action", U.S. Appl. No. 11/512,793, (Aug. 24, 2010), 19 pages.

"Advisory Action", U.S. Appl. No. 10/446,623, (Mar. 19, 2009), 3 pages.

"Non Final Office Action", U.S. Appl. No. 10/446,623, (Apr. 16, 2009), 26 pages.

Anonymous, "Editing Word Processor Documents", *IBM Technical Disclosure Bulletin*, XP002109976 New York, US. ., vol. 40, No. 7, pp. 187-188.

Anonymous, "Graphical Command Line", "*IBM Technical Disclosure Bulletin*"Newe York, US the whole document., vol. 32, No. 8B, pp. 313-314, XP002109975.

Baker, Steven "Hypertext Browsing on the Internet", (Sep. 1994),v12 n9 p. 21 (6).

Berg, "How do I send e-mail from a Java applet?",*Dr. Dobbs Journal*, http://www.ddj.com/184409944?pgno=., Abstract.*, (Aug. 1996), vol. 21, Issue 8.

Blumfield, Julie R., et al., "Step-By-Step to a World-Class Web Site", *Windows Magazine*, vol. 6, No. 8, (Jul. 1995),14 pages.

Bolot, et al., "Scalable Feedback Control for Multicast Video Distribution in the Internet", *Proceedings of the conference on Communications architecture, protocols and applications*, (1994),58-67.

Brooks, et al., "Application-Specific Proxy Servers as HTTP Stream Transducers", *World Wide Web Journal*, (Dec. 1995),pp. 539-548.

Brown, Marc H., et al., "A New Paradigm for Browsing the Web", *Short Papers, CHI'95 Mosaic of Creativity*, ACM digital library, (May 7-11, 1995),320-321.

Brown, Mark R., "Using Netscape 2 (pp. 147-168, 213-232)", *Que Corporation*, 3-0402-00121-8504, (1995), 147-168, 213-232.

Brown, Mark R., "Using Netscape 2 (pp. 327-375)", *Que Corporation*, 3-0402-00121-8504, (1995),327-375.

Chung-Ming, Huang et al., "Multimedia E-Mail: The Evolution Approach Based on Adapters", *Software Practice & Experience*, XP000655471 ISSN: 0038-644 pp. 794, line 3—p. 797, Line 2: figures 11, 12.,(Sep. 1, 1994),vol. 24, No. 9 pp. 785-800.

Davis, Stephen R., "Teach Yourself Java Programming the Quick and Easy Way with Microsoft Visual: Learn Java Now", *Microsoft Press* 3 0402 00136 8093.

Developers At Sun.Com, ""Applets," from http://java.sun.com/applets", (Feb. 25, 2005),pp. 9-10 of print out.

Doan, "Java perks up client mail", *InfoWorld*, (Oct. 14, 1996),vol. 18, Issue 42, p. 1.

Doan, "Lotus Demonstrates cc:Mail for java Prototype Client", *InfoWorld*, (Dec. 16, 1996), vol. 18, Iss. 51, p. 47.

Fox, et al., "Adapting to Network and Client Variability via On-Demand Dynamic Transcoding", Available at: http://citeseer.ist.psu.edu/fox96adapting.html. (1996).

Fox, et al., "Reducing WWW Latency and Bandwidth Requirements by Real-Time Distillation", *Computer Networks and ISDN Systems*, Available at: http://citeseer.ist.psu.edu/fox96reducing.html, (May 1996), vol. 28, issues 711, p. 1445.

Graham, Malcolm et al. "Webbed Documents", *ACM digital library*, Savannah, Georgia, (Oct. 1995), 58-62.

McNamara, "Start-up Novita makes multimedia E-mail a snap", *Network World*, (Dec. 9, 1996),vol. 13, Issue 50, p. 31.

Ouhyoung M, et al., "The MOS Multimedia E-Mail System", *Proceedings of the International Conference on Multimedia Computing and Systems*(May 19, 1994), pp. 315-324, XP002073636, p. 315, right-hand col., line 21—p. 319, left-hand column, line 3; figure 1, 2; table 1.

Shimada, et al., "Interactive scaling control mechanism for World-Wide Web systems", *Computer Networks and ISDN Systems*, (Sep. 1997), vol. 29, Issue 8-13, pp. 1467-1477.

Tessier, Tom "Using Java Script to Create Interactive Web Pages", *Dr. Dobbs Journal on CDROM*, (Mar. 1996).

Webauthor for Word, "My First Web Document".

* cited by examiner

MICRO-CLIENT FOR INTERNET APPLIANCES

RELATED MATTERS

This application claims priority under 35 U.S.C. §120 as a continuation of U.S. patent application Ser. No. 11/512,793, filed Aug. 30, 2006 (BTAS0024; pending), which is a continuation of U.S. patent application Ser. No. 10/418,951, filed Apr. 18, 2003 (BTAS0023, now U.S. Pat. No. 7,325,077), which is a continuation of U.S. patent application Ser. No. 08/918,096, filed Aug. 21, 1997 (BTAS0022, now U.S. Pat. No. 6,564,250), the entire disclosures of which are hereby incorporated by reference.

BACKGROUND

An "internet appliance" may be configured as a relatively inexpensive, relatively low-powered processor which is capable of connection to a network of computers, the largest of which is commonly known as the "internet" (but such networks may be independent networks or may be part of a private network commonly known as an "intranet"). An internet appliance is typically designed to provide access to services available using the internet, including electronic mail and access to the world wide web. An internet appliance provides such access using client software which interfaces to server software on another, relatively more powerful, processor which has a more direct connection to the internet.

One problem which has arisen in the art is that resource limitations of the internet appliance limit the capability of the internet appliance to provide features in the client software. For a first example, communication link or memory limitations of the internet appliance can limit the ability of the internet appliance to provide quality graphics display. For a second example, memory or processor limitations of the internet appliance can cause the internet appliance to be unable to run applets using Java (or using other applet languages such as ActiveX), or to be unable to provide editing features for graphics or other web page features.

SUMMARY

A method and system are described for providing features for internet access at an internet appliance which go beyond the resource limitations of the internet appliance. The features may be implemented on the server, and coupled to the internet appliance for display, responsive to the ability of the internet appliance to provide those features. In particular embodiments, (1) the internet appliance and the server adapt to communication link limitations by dynamically adjusting picture quality or size for graphics to be displayed; (2) the internet appliance and the server adapt to memory and processor limitations by dynamically running applets at the server and intercepting display functions of applets for display at the internet appliance; and (3) the internet appliance and the server adapt to memory and processor limitations by dynamically running editing programs or web pages at the server and by dynamically adjusting picture quality or size for graphics to be displayed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In the following description, embodiments are described with regard to process steps and data structures. Those skilled in the art would recognize after perusal of this application that embodiments can be implemented using general purpose processors or special purpose processors adapted to particular process steps and data structures described herein, and that implementation of the process steps and data structures described herein would not require undue experimentation.

Techniques described herein can be used in conjunction with techniques described in the following applications: application Ser. No. 08/918,698, filed Aug. 21, 1997, (pending) in the name of the same inventor, titled "Active Electronic Mail", and application Ser. No, 08/918,094, filed Aug. 21, 1997, U.S. Pat. No. 6,032,150 in the name of the same inventor, titled "Secure Graphical Objects in Web Documents." Each of these applications is hereby incorporated by reference as if fully set forth herein.

Miniclient and Server

Figure 1:
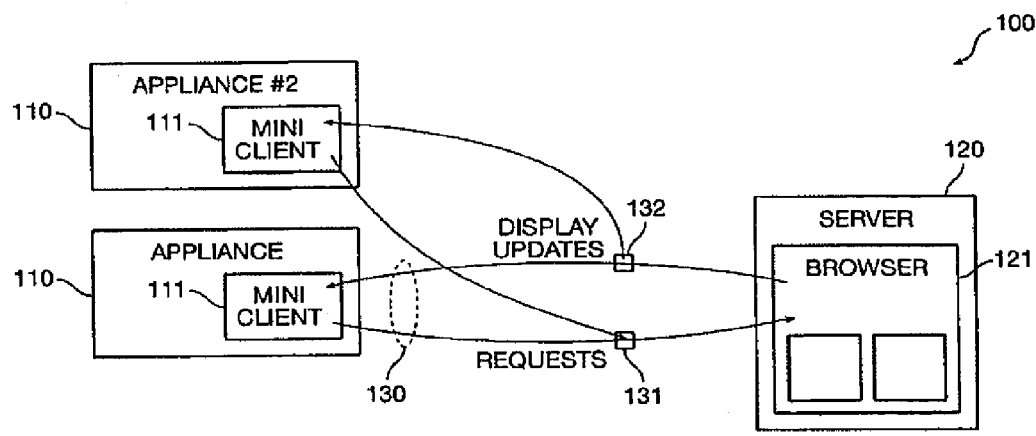
FIG. 1 shows a block diagram of a system including an internet appliance and a server, in use for displaying graphics.

FIG. 1 shows a block diagram of a system including an internet appliance and a server, in use for displaying graphics.

In a system 100 including an internet appliance 110 and a server 120, the internet appliance 110 includes a miniclient 111, while the server 120 includes a full web browser 121.

The miniclient 111 comprises a web client which has been stripped down; it may use relatively limited resources of the internet appliance 110 (such as relatively limited memory or processing capability), and consequently has relatively limited capability. The miniclient 111 is capable of transmitting web requests entered by a user, capable of displaying web pages, in a manner described herein, and capable of other functions described herein.

The web browser 121 comprises a full-featured web client which is able to take advantage of the relatively greater resources of the server 120 (such as relatively greater memory or processing capability), and consequently has capabilities found in web clients which are designed for full-featured computers. In an embodiment, the web browser 121 might have features such as found in Microsoft Corporation's "Internet Explorer" product or Netscape Corporation's "Netscape Navigator" product.

For example, these features might include transmitting web requests entered by the user and transmitted from the internet appliance 110 to the server 120, preparing web pages for display by the miniclient 111 at the internet appliance 110, caching web pages and other web objects for use by the miniclient 111 at the internet appliance 110, and running applets embedded in web pages.

As used herein, the term "web" as used in the phrases "web client", "web page", and the like, refers to information transfer using the hypertext transmission protocol (HTTP), and extensions and variants thereof. The reader is cautioned that HTTP is a rapidly evolving protocol, with many variants and many extensions, modifications, and variants thereof, both official and unofficial. Some of these extensions, modifications, and variants include those which have security features, those which are particular to certain languages or character sets, those which are particular to certain display features, and so on. Not all web browsers are compatible with all extensions, modifications, and variants of HTTP, and it is expected both that further extensions, modifications, and variants of HTTP will continue to develop, and that this lack of industry-wide compatibility will continue for the near future.

Those skilled in the art would be aware, after perusing this application, that the techniques described herein are applicable to such extensions, modifications, and variants of HTTP, without undue experimentation, and that the scope and spirit is broad enough to encompass such applications.

The miniclient 111 and the web browser 121 are coupled by a communication link 130. The miniclient 111 transmits a set of web requests 131 to the web browser 121 on the communication link 130. The web browser 121 receives the web requests 131 and (if they are not already in a dialect of HTTP) transforms them into proper HTTP protocol requests and transmits them to a web server (not shown). The web server serves up web pages and other web objects to the web browser 121, which caches them and prepares them for display by the miniclient. The web browser 121 transmits a set of display updates 132 to the miniclient 111 on the communication link 130. The miniclient 111 receives the display updates 132 and updates its display for presentation to the user.

Figure 2:
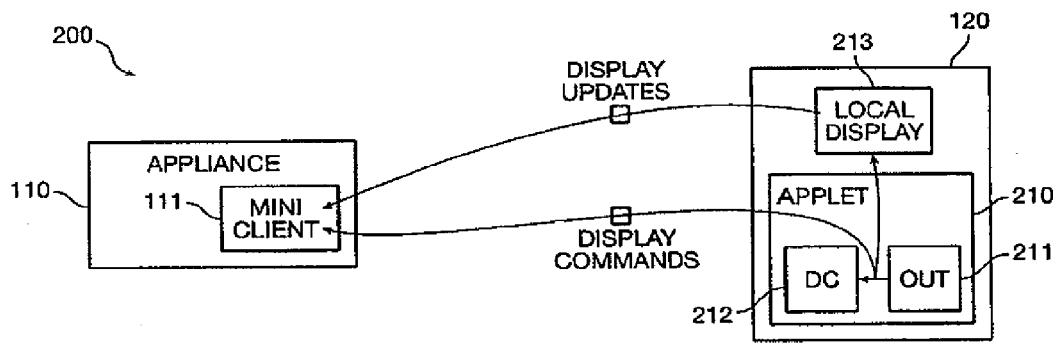
FIG. 2 shows a block diagram of a system including an internet appliance and a server, in use for running applets.
Figure 3:
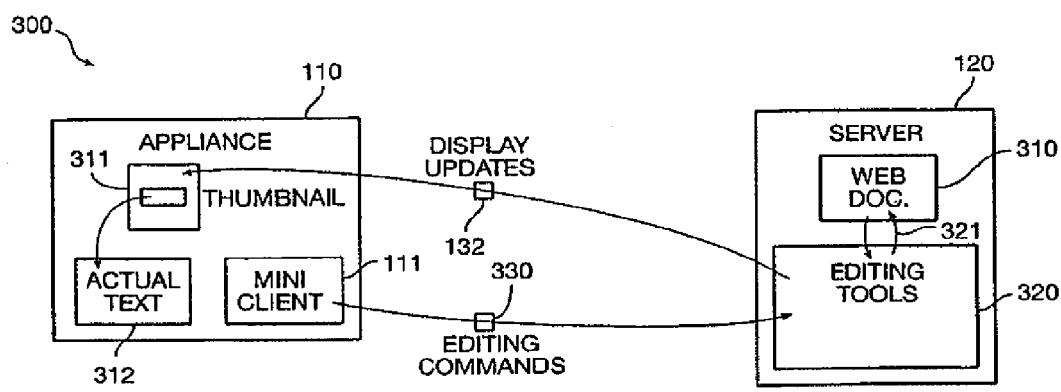
FIG. 3 shows a block diagram of a system including an internet appliance and a server, in use for editing applets or web pages.

The components shown in FIGS. 1-3, and described throughout the specification (e.g., the internet appliance 110, the server 120, etc.), may include or be implemented using computer-readable storage medium.

"Computer-readable storage medium" includes volatile and non-volatile, removable and non-removable media implemented in any method or technology for storage of information such as computer readable instructions, data structures, program modules, or other data. Computer-readable storage medium can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Displaying Graphics

In an embodiment, the communication link 130 includes a cellular telephone communication circuit or other radiotelephone communication circuit. In alternative embodiments, the communication link 130 includes other communication elements, such as other telephone communication circuits, frame relay or packet radio communication circuits, or other methods of communication.

The communication link 130 might accordingly be a limited resource, either by bandwidth (because of the quality of the communication circuit), by expense (because of the cost of maintaining the communication circuit), by availability (because of the physical difficulty of maintaining the communication circuit), and so on. For example, in the case the communication link 130 includes a cellular telephone communication circuit or other radiotelephone communication circuit, each minute of communication may be relatively expensive, have limited bandwidth, and may also be subject to periods of unavailability due to the radio transmission environment.

When transmitting the display updates 132, the web browser 121 adjusts a measure of relative quality of the web page to be displayed (or a graphic element therein) in response to the relative quality of the communication link 130. The measure of relative quality might include the relative coarseness or fineness of the graphic element, the relative size of the graphic element, the relative color density of the graphic element, the relative lossiness of compression of the graphic element, or other measures of quality of the graphic element.

In a preferred embodiment, adjustments to the relative quality of the web page to be displayed can also be made with regard to one or more graphic elements, such as pictures, to be displayed with the web page. Similarly, any adjustment to the relative quality of the web page to be displayed can also be made with regard to text to be displayed with the web page, either by compressing the text or by serving text which fits within a display window for the miniclient 111.

In a preferred embodiment, the web browser 121 dynamically measures the relative quality of the communication link 130, such as the bandwidth available using the communication link 130, the cost of using the communication link 130, the bit error rate or other availability measure for the communication link 130, or other measures of relative quality of the communication link 130.

Upon dynamically measuring the relative quality of the communication link 130, the web browser 121 adjusts the display updates 132 to account for that dynamic measure. In a preferred embodiment, the web browser 121 dynamically adjusts the relative quality of the web page (or the graphic element therein) for display, so as to maintain relatively constant a measure of resource usage at the miniclient 111. For example, the measure of resource usage might be the amount of time taken to serve the web page to the miniclient 111 or the monetary cost associated with serving the web page to the miniclient 111.

In alternative embodiments, the miniclient 111 informs the web browser 121 of a display resolution or a display size which is available at the miniclient 111 for web pages, and the web browser 121 adjusts the relative quality of the web page (or the graphic element therein) for display, so as to match the display to the display capability of the miniclient 111. For example, the web browser 121 can adjust the display size of a graphic element so that the graphic element can be displayed at the miniclient 111 without any requirement for scrolling.

The miniclient 111 also has one or more additional commands by which the user can instruct the web browser 121 to adjust the measure of relative quality of the web page for display (or of the graphic element therein) to a selected relatively constant value, or to a selected value associated with a selected relatively constant measure of resource usage at the miniclient 111. Thus, for example, the user can instruct the web browser 121 to display graphic elements at the miniclient 111 at a selected resolution, or can instruct the web browser 121 to display graphic elements at the miniclient 111 so that each web page is served in no more than 50 seconds of cellular air time.

In an embodiment, the miniclient 111 also has one or more additional commands by which the user can also instruct the web browser 121 to continue serving progressive information about the graphic element even after the graphic element is ready for display at the miniclient 111, so that the user can, for example, enter a command (such as a control key or a mouse click), to obtain a relatively better quality or relatively larger size graphic element, or further text which otherwise would not be displayed. In alternative embodiments, the continued serving of progressive information about the graphic element can occur even after the user has spent substantial time reviewing the graphic element.

In an embodiment, a second internet appliance 110 with a second miniclient 111 can duplicate the display of the first miniclient 111 by receiving the display updates 132 and presenting a display which is identical to the first miniclient 111.

In alternative embodiments, the second miniclient 111 can also transmit web requests 131 using the communication link 130 (where the communication link 130 is susceptible to such common usage), so that either miniclient 111 can affect the display of the other miniclient 111.

Running Applets

FIG. 2 shows a block diagram of a system including an internet appliance and a server, in use for running applets.

In a system 200 including an internet appliance 110 and a server 120, the internet appliance 110 includes a miniclient 111, while the server 120 includes an applet 210.

Because the miniclient 111 has no Java capability or only relatively limited Java capability in this instance, it may be desirable to execute the applet 210 on the server 120. The applet 210 includes a set of advanced window tools 211 and a set of display classes 212. In normal operation, the applet 210 provides a local display 213 for the server 120, which if the server 120 were local to the user, would be displayed to the user.

The server 120 dynamically receives the applet 210, such as from a web page which it has accessed at the request of the miniclient 111 (at the behest of the user), and dynamically executes the applet 210 at the server 120. One of two alternative embodiments is preferred.

First, the server 120 may generate the local display 213 and transmit display updates 132 to the miniclient 111 in response thereto.

Second, the server 120 may intercept calls made by the applet 210 from the advanced window tools 211 to the set of display classes 212, and transmit those calls as display commands to the miniclient 111 for execution at the miniclient 111.

In either embodiment, the miniclient 111 is not required to execute or interpret Java code, and is able to display the results of the executing applet 210 as if the applet 210 were actually executing at the miniclient 111.

Editing Applets or Web Pages

FIG. 3 shows a block diagram of a system including an internet appliance and a server, in use for editing applets or web pages.

In a system 300 including an internet appliance 110 and a server 120, the internet appliance 110 includes a miniclient 111, while the server 120 includes web document 310 or other web object.

Because the miniclient 111 may have relatively limited memory, it may be desirable to maintain the web document 310 and editing tools 320 on the server 120. The miniclient 111 receives editing commands 330 from the user and transmits those editing commands 330 to the server 120.

The server 120 receives the editing commands 330 and passes them to the editing tools 320, which edit the web document 310 at the server 120. The server 120 receives the HTML updates 321 and updates the web document 310, including updating any applets, graphical elements or references to other web objects.

The server 120 dynamically generates a reduced-size ("thumbnail") graphic display 311 of the web document 310, and transmits display updates 132 for the thumbnail graphic display 311 to the miniclient 111. The miniclient 111 dynamically displays the thumbnail graphic display 311 so the user can review changes to the web document 310 as they are made. The server 120 dynamically adjusts quality and size of the thumbnail graphic display 311 as described herein.

Where the web document 310 includes actual text 312, the miniclient 111 receives the actual text 312 from the server 120 and displays the actual text 312 in a separate display window for the user.

Alternative Embodiments

Although example embodiments are disclosed herein, many variations are possible which remain within the concept, scope, and spirit of the invention, and these variations would become clear to those skilled in the art after perusal of this application.

What is claimed is:

1. A method, comprising:
responsive to a transmission measure for a communication link between a server and a client, dynamically adjusting a quality measure by the server for updates to a web object; and
transmitting the adjusted updates by the server for receipt and display by the client via the communication link, wherein the adjusted updates include a first update, wherein the transmitting includes:
transmitting the first update adjusted to a first level of the quality measure, and
responsive to a first command, transmitting information to adjust the first update from the first level to a second level of the quality measure, wherein the second level is greater than the first level, and wherein responsive to one or more additional commands, continuing to obtain the information to adjust a display of the web object at the client, and
wherein the client is further configured to request a web page from the server that includes embedded executable code and receive a displayable result from the server, the displayable result generated by the server by fetching the web page over a network and executing the embedded executable code of the fetched web page at the server.

2. The method of claim 1 wherein the adjusting of the quality measure is performed substantially smoothly.

3. The method of claim 1 wherein the transmission measure is a bit transmission rate.

4. The method of claim 1 wherein the quality measure is a measure of picture quality.

5. The method of claim 1 wherein the quality measure is a measure of picture size.

6. The method of claim 1 further comprising dynamically measuring the transmission measure by the server.

7. The method of claim 1 wherein the adjusting is performed so that display of a single web page takes substantially constant time.

8. The method of claim 1 wherein the communication link is associated with a measure of transmission cost.

9. The method of claim 8 wherein the adjusting is performed so that display of a single web page takes substantially constant cost.

10. The method of claim 1 wherein the web object is a web page and the updates include updates to elements of the web page described in HTML language.

11. The method of claim 1 wherein the web object includes non-image elements.

12. The method of claim 1 wherein the web object is a graphic.

13. A computer-readable storage medium, where the medium is not a signal, having instructions stored thereon, the instructions configured to:
generate updates for a graphic responsive to editing commands received from a client via a communication link;
adjust a graphic quality measure for the updates in response to a transmission measure for the communication link, wherein the updates include a first update;
transmit to the client the first update adjusted to a first level of the graphic quality measure; and responsive to a first command, transmit to the client information to adjust the first update from the first level to a second level of the graphic quality measure, wherein the second level is greater than the first level, and wherein responsive to one or more additional commands, continue to obtain the information to adjust a display of the graphic at the client, and wherein the client is further configured to request a web page from a server that includes embedded executable code and receive a displayable result from the server, the displayable result generated by the server by fetching the web page over a network and executing the embedded executable code of the fetched web page at the server.

14. The computer-readable storage medium of claim 13 wherein the adjustment of the quality measure is performed substantially smoothly.

15. The computer-readable storage medium of claim 13 wherein the instructions are further configured to cause the updates to be transmitted via the communication link for receipt and display by the client.

16. An apparatus comprising at least a memory and a processor to implement a web client, the web client configured to receive updates to a graphic via a communication link from a server, the updates having a quality measure that is dynamically adjusted by the server responsive to a transmission measure for the communication link, wherein the updates include a first update, wherein the web client is further configured to:

receive the first update adjusted to a first level of the quality measure, responsive to a first command, receive information to adjust the first update from the first level to a second level of the quality measure, wherein the second level is greater than the first level, and responsive to one or more additional commands, continue to obtain the information to adjust a display of the graphic at the web client, and wherein the web client is further configured to request a web page from the server that includes embedded executable code and receive a displayable result from the server, the displayable result generated by the server by fetching the web page over a network and executing the embedded executable code of the fetched web page at the server.

17. The apparatus of claim 16 wherein the adjustment of the quality measure is performed substantially smoothly.

18. The apparatus of claim 16 wherein the transmission measure is a bit transmission rate.

19. The apparatus of claim 16 wherein the quality measure is a measure of picture quality or picture size.

20. A method, comprising:

obtaining a transmission measure by a server for a communication link between the server and a client;

adjusting a quality measure of a first update for a web object based on the transmission measure by the server for transmission of the web object;

adjusting a quality measure of a second update for the web object based on the transmission measure by the server for transmission of the web object, the quality measure of the second update being higher than the quality of the first update;

transmitting the first update and the second update to the client; and responsive to a first command, transmitting to the client information to adjust the first update from a first level to a second level of the quality measure, wherein the second level is greater than the first level, and wherein responsive to one or more additional commands, continuing to transmit the information to adjust a display of the web object at the client, and wherein the client is further configured to request a web page from a server that includes embedded executable code and receive a displayable result from the server, the displayable result generated by the server by fetching the web page over a network and executing the embedded executable code of the fetched web page at the server.

21. The method of claim 20 further comprising receiving an instruction from the client to adjust the quality measure of the second update, the adjusting the quality measure of the second update responsive to receiving the instructions from the client.

22. The method of claim 20 wherein the transmission measure is a bit transmission rate.

23. The method of claim 20 wherein the quality measure is a measure of picture quality or a measure of picture size.

* * * * *

UNITED STATES PATENT AND TRADEMARK OFFICE
CERTIFICATE OF CORRECTION

PATENT NO. : 8,224,998 B2
APPLICATION NO. : 12/552188
DATED : July 17, 2012
INVENTOR(S) : Nguyen Page 1 of 1

It is certified that error appears in the above-identified patent and that said Letters Patent is hereby corrected as shown below:

On the Face Page, in Field (76), under "Inventor", in Column 1, Line 1, delete "T" and insert -- T. --, therefor.

On Page 2, in Field (56), under "OTHER PUBLICATIONS", in Column 2, Line 10, delete "US. .," and insert -- US, --, therefor.

On Page 2, in Field (56), under "OTHER PUBLICATIONS", in Column 2, Line 12, delete ""IBM" and insert -- IBM --, therefor.

On Page 2, in Field (56), under "OTHER PUBLICATIONS", in Column 2, Line 13, delete "Bulletin"Newe York, US the whole document.," and insert -- Bulletin, New York, US, the whole document, --, therefor.

On Page 2, in Field (56), under "OTHER PUBLICATIONS", in Column 2, Line 18, delete "pgno=.," and insert -- pgno=3, --, therefor.

On Page 2, in Field (56), under "OTHER PUBLICATIONS", in Column 2, Line 37, delete "12.,(Sep. 1, 1994),vol. 24, No. 9" and insert -- 12, (Sep. 1, 1994), vol. 24, No. 9, --, therefor.

On Page 3, in Field (56), under "OTHER PUBLICATIONS", in Column 1, Line 1, delete "al." and insert -- al., --, therefor.

Signed and Sealed this
Fifth Day of February, 2013

Teresa Stanek Rea
*Acting Director of the United States Patent and Trademark Office*